Aug. 27, 1946.  A. C. GOUGH  2,406,365
ELECTRODE HOLDER
Filed Aug. 27, 1943  2 Sheets-Sheet 1
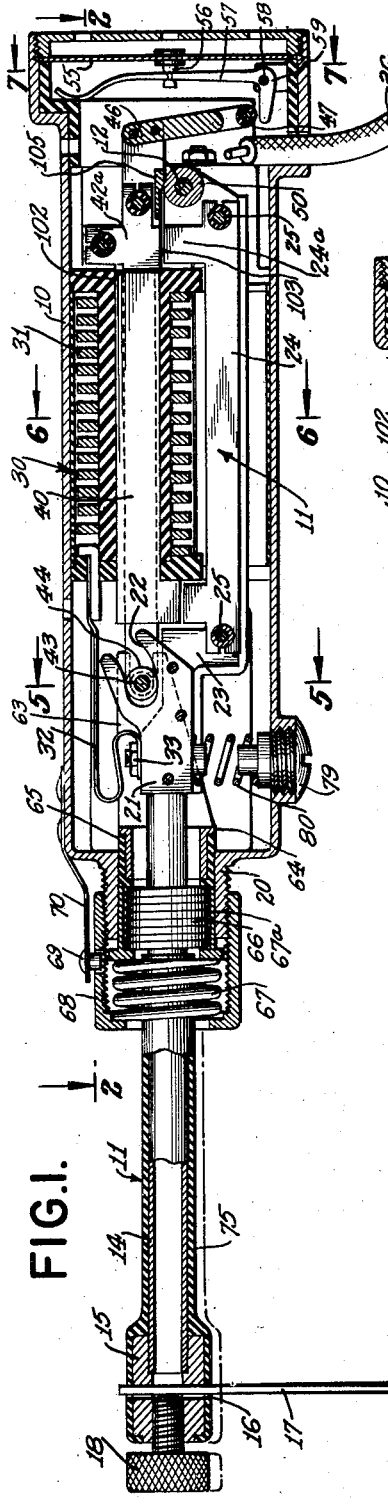
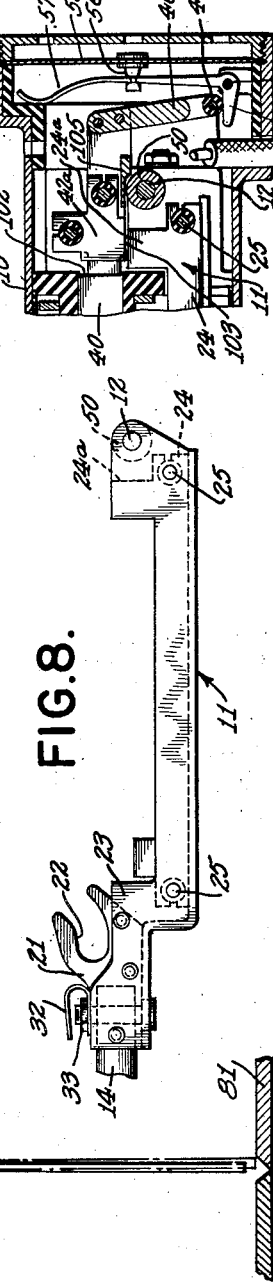
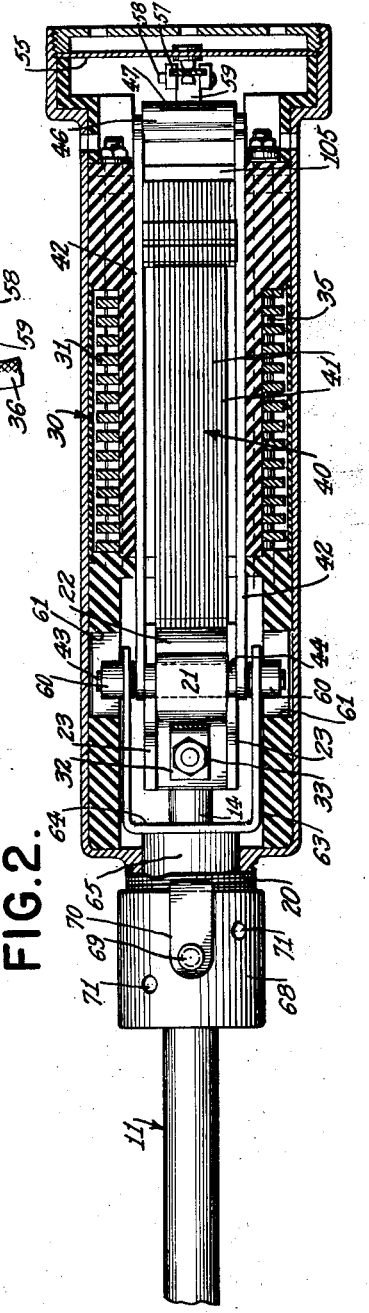
INVENTOR.
ACHILLES C. GOUGH
BY Hoguet, Neary & Campbell
ATTORNEYS Aug. 27, 1946.                A. C. GOUGH                    2,406,365
                            ELECTRODE HOLDER
                        Filed Aug. 27, 1943          2 Sheets-Sheet 2
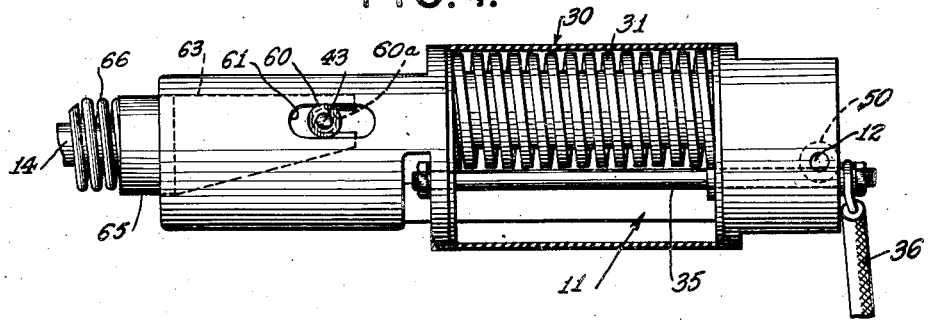
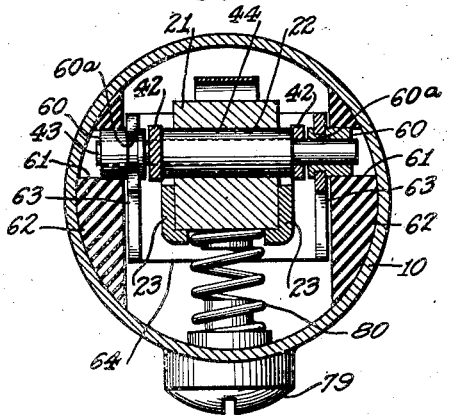
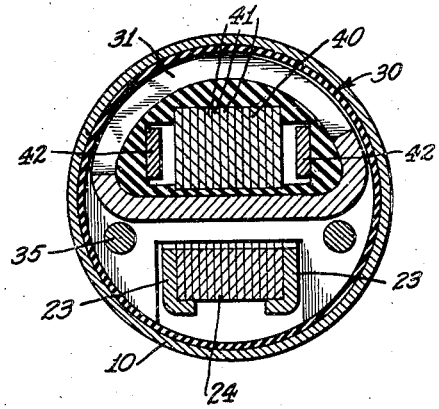
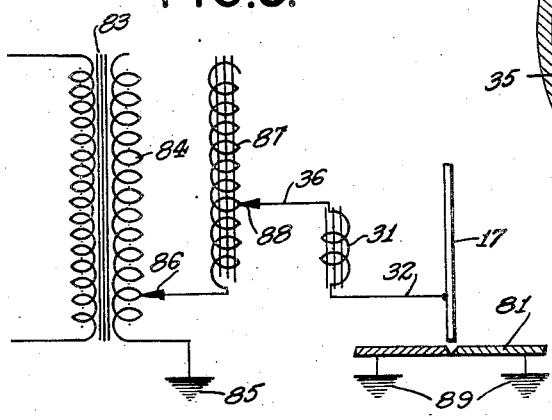
INVENTOR.
ACHILLES C. GOUGH
BY
Hoguet, Neary & Campbell
ATTORNEYS

Patented Aug. 27, 1946

2,406,365

UNITED STATES PATENT OFFICE 2,406,365

ELECTRODE HOLDER

Achilles C. Gough, Pocatello, Idaho

Application August 27, 1943, Serial No. 500,211

9 Claims. (Cl. 219—8)

This invention relates to welding electrode holders and has for an object to provide a holder for hand welding which utilizes the current flow at the initial contact of the electrode for automatically striking an arc of proper length for welding and which utilizes variations in welding current for producing an audible signal to indicate to the operator variations in length of the arc from its correct value.

Another object is to provide a hand welding electrode holder of the type above indicated having novel and improved details of construction and features of operation.

Various other objects and advantages will be apparent as the nature of the invention is more fully disclosed.

Although the novel features which I believe to be characteristic of this invention are pointed out more particularly in the claims appended hereto, the invention itself may be better understood by referring to the following description, taken in connection with the accompanying drawings in which a specific embodiment thereof has been set forth for purposes of illustration.

In the drawings:

Fig. 1 is a vertical longitudinal sectional view through an electrode holder embodying the present invention;

Fig. 2 is a horizontal section taken on the line 2—2 of Fig. 1;

Fig. 3 is a detail view of the signalling mechanism showing the parts in position to emit an audible signal;

Fig. 4 is a detail view of the solenoid assembly;

Figs. 5, 6 and 7 are transverse sections taken on the lines 5—5, 6—6 and 7—7, respectively, of Fig. 1;

Fig. 8 is a broken side elevation of the pivoted arm; and

Fig. 9 is a diagram showing the circuit connections.

In the following description certain specific terms are used for convenience in referring to various details of the invention. These terms, however, are to be given as broad an interpretation as the state of the art will permit.

Referring to the drawings more in detail the invention is shown as applied to an electrode holder comprising a housing 10 which constitutes both a support and a handle for operating the device. An arm 11 extends axially of the housing 10 and is pivoted to the housing by a pin 12. The arm 11 comprises a tubular member 14, having at its free end an electrode clamp comprising a block 15 having a bore 16 suitable for receiving an electrode 17, and having a screw 18 for securing the electrode 17 in place. The exposed parts of the member 14 and block 15 may be covered by a suitable insulating material 75. The tubular member 14 extends loosely through a hub 20 of the housing 10 and carries at its inner end a block 21 which is provided with a curved slot 22 for the purpose to be described. To the block 21 is secured a pair of side plates 23 between which is clamped an armature 24 shown as comprising a plurality of laminations secured by a suitable means such as pins 25. The side pieces 23 are pivoted to the pin 12 above described and are positioned by a spacing roller or sleeve 50. A spring 80 is mounted beneath the block 21 and may be adjusted by a screw 79 for controlling the tension thereof. The spring 80 normally holds the arm 11 in its upper or welding position. The arm may, however, be latched in its lower position when the core 40 is retracted by the roller 44.

An electromagnet 30 is rigidly secured in the housing 10. This electromagnet is provided with an energizing coil 31, one end of which is shown as connected by a flexible conductor 32 to the block 21 by a bolt 33 which likewise secures the block 21 to the tubular member 14. The other end of the coil 31 is connected by a bolt 35 to a current lead 36.

The electromagnet 30 is provided with an axial core 40 which is shown as comprising a plurality of laminations 41, and with a laminated armature 42a clamped between side pieces 42. The side pieces 42 extend on opposite sides of the core 40 and carry at their forward ends a pin 43 carrying a roller 44 which engages the slot 22 in the block 21. The armature 42a makes a gap 102 with the end of the core 40 and a gap 103 with a projection 24a of the armature 24. At their rearward ends the side pieces 42 carry a downwardly extending back flange 46 carrying a roller 47.

The audible signalling device comprises a diaphragm 55 which is mounted at the rear of the housing 10 and carries a pin 56 which is adapted to engage a spring member 57 which bears against the housing 10. The member 57 is pivoted at 58 and carries an arm 59 which bears against the roller 47.

The pin 43 carries a pair of rollers 60 which are adapted to slide axially in slots 61 formed in supporting members 62 which are secured in the housing 10. These rollers 60 are provided with grooves 60a which are engaged by arms 63 of a yoke 64 carried by a sleeve 65. The sleeve 65 slides in the hub 20 of the housing 10 and engages a spring 66 which exerts axial pressure thereon. In the embodiment shown the spring 66 is carried in a second sleeve 67a which engages a spring 67, held within a cap 68 threaded onto the hub 20 and adjustable for varying the pressure of the springs 66 and 67 on the sleeve 65. The cap 68 may be locked in adjusted position by a stud 69 carried on a spring member 70 attached to the housing 10 and engaging recesses 71 in the surface of the cap 68.

The armature 24 is of a shape to form a substantially closed magnetic circuit with the core 40 and the armature 42a. The armature 42a is preferably made of a magnetic material capable of responding to a comparatively high frequency such as laminated, highly permeable, transformer steel or powdered Permalloy compressed to suitable form and having properties similar to those used in radio reactors. The armature 24 is preferably of a type which does not respond to these high frequencies. The armature 42a is provided with a lip 105 bearing on the roller 50 carried by the housing 10 to raise the armature 42a and increase the air gap 103 when the armature moves forward toward the core 40.

In the circuit diagram of Fig. 9 welding current is supplied by a transformer 83 having a secondary 84, one side of which is grounded at 85. An adjustable tap 86 of the secondary 84 is connected to a reactance coil 87 having a variable tap 88 which is connected by the welding lead 36 to the coil 31 and thence by the lead 32 and the arm 11 to the welding electrode 17. The workpiece 81 is grounded as at 89.

In the operation of this device the armature 42a is initially held by the springs 66 and 67, the yoke 64, the rollers 60 and the pin 43, in its rearward position as indicated in Fig. 3. In this position the roller 47 bears on the arm 59 to hold the armature 42a elevated and to transmit vibratory movement from the armature 42a to the diaphragm 55.

The electrode 17 is now brought into contact with the work piece 81 as indicated in broken lines in Fig. 1. When the initial contact current flows the electromagnet 30 is energized and causes the armature 42a to move forwardly. The roller 44 is thus moved forwardly in the slot 22 against the force of the springs 66 and 67, thereby releasing the arm 11 and permitting the same to be moved upwardly by the spring 80 to the position shown in full lines in Fig. 1. This position is predetermined in accordance with the correct length of welding arc. The spring 80, in addition to automatically causing the electrode 17 to strike an arc of the correct length, prevents the electrode from sticking to the work piece at contact. When the armature 42a is moved forwardly as above indicated, roller 50 lifts the armature 42a, thereby increasing the gap 103 as the gap 102 is reduced, so as to improve the operation. The roller 47 is also brought out of engagement with the arm 59.

During the welding operation the armature 42a tends to vibrate about the roller 44 as an axis due to the comparatively high frequency variations in welding current caused by the formation of individual globules on the welding electrode and the deposition of these globules on the workpiece. At the instant of contact of the globules with the workpiece the resistance becomes less than that when the globule has become detached from the electrode. This variation in resistance produces a variable current which fluctuates at a frequency corresponding to the frequency of globule formation.

The armature 24 having a comparatively low frequency response is unaffected by the above mentioned high frequency magnetic variations. The armature 42a, however, tends to follow these fluctuations, but when in its forward position the vibrations are not transmitted to the arm 59.

If the average welding current should decrease due, for example, to a lengthening of the welding arc, the magnetizing force is correspondingly decreased and the armature 42a is moved rearwardly by the force of the springs 66 and 67 to a position at which a new balance is obtained. If the armature 42a is moved rearwardly to an extent such that the roller 47 engages the arm 59, the vibration of armature 42a is transmitted to the diaphragm 55 and causes an audible response. This response indicates to the operator that the welding arc has become too long. When the condition is corrected by bringing the electrode 17 nearer the workpiece 81 the armature 42a is again drawn forwardly by the increased magnetic force and the audible signal ceases.

In certain welding operations such as in welding very thin metal, the adjustment may be made to permit the armature 42a to remain slightly back of its forward position so that a faint audible signal will be produced by the diaphragm 55. Variations in this signal will then correspond to deviations in arc length and permit the operator to maintain an accurate control so as not to puncture the metal.

It is to be noted that the high frequency magnetic variation produces both a longitudinal and transverse movement of the armature 42a. This longitudinal movement aids in producing vibrations of the diaphragm 55 above referred to. The forward portion of the slot 22 should extend horizontally so as to prevent axial vibratory movement of the arms 42 from affecting the position of the arm 11.

When using alternating current an audible signal may be produced by rapid impingement of the armature 42a upon the armature 24. If this signal is sufficient the diaphragm 55 and the cooperating parts may be omitted.

Springs 66 and 67 may be adjusted by means of the cap 68 to exert a force corresponding to the magnetizing force of the welding current when the welding arc is of the correct length. In practice the springs should be adjusted so that the signal producing member will not be actuated until the welding current falls slightly below the normal value, except in cases where extremely thin material is to be welded, in which event a continuous signal may be required.

In the embodiment shown two springs 66 and 67 are provided. In this form the spring 66 may have only sufficient force to return the armature 42a to its original position when no current is flowing in the welding circuit and the spring 67 may have sufficient force at the various settings to balance the magnetizing force. This improves the operation as the pull of the core 40 is small when the gap 102 is large with the armature 42a in its rearmost position.

Although a specific improvement of the invention has been shown and described, it is to be understood that the invention is capable of various uses and that it is only to be restricted in accordance with the scope of the following claims.

I claim:

1. A welding electrode holder comprising a housing constituting a support and handle, an arm extending axially beyond said housing and pivoted thereto, an electrode clamp carried at the free end of said arm, an audible signalling device, means including electromagnetic means actuated by the welding current to cause pivotal movement of said arm for striking the welding arc, and means responsive to variations in the energization of said electromagnetic means for actuating said signalling device.

2. A welding electrode holder comprising a housing constituting a support and handle, an arm extending axially beyond said housing and pivoted thereto, an electrode clamp carried at the free end of said arm, and audible signalling device, means latching said arm in a lower position, means including electromagnetic means responsive to welding current to elevate said arm a predetermined distance suited to strike a welding arc, and means responsive to reduced energization of said electromagnetic means to actuate said audible signalling device.

3. A welding electrode holder comprising a housing constituting a support and handle, an arm extending axially beyond said housing and pivoted thereto, an electrode clamp carried at the free end of said arm, an audible signalling device, spring means normally holding said arm in elevated position, means latching said arm in a lower position, means including electromagnetic means responsive to welding current to release said latching means, and means actuated by said electromagnetic means in response to reduced energization thereof for actuating said audible signalling device.

4. A welding electrode holder comprising a housing constituting a support and handle, an arm extending axially beyond said housing and pivoted thereto, an electrode clamp carried at the free end of said arm, electromagnetic means having an armature responsive to variations in average welding current and also responsive to high frequency variations in welding current due to globule formation during welding, means latching said arm in a lower position, means actuated by said armature in response to contact current flow for releasing said latching means, means raising said arm to welding position, a vibratable diaphragm, and means engaged by said armature, when in an axial position corresponding to a decreased welding current, to actuate said diaphragm.

5. A welding electrode holder comprising a housing constituting a support and handle, an arm extending axially beyond said housing and pivoted thereto, an electrode clamp carried at the free end of said arm, electromagnetic means connected to be actuated in response to variations in welding current and having an armature movable axially in accordance with variations in welding current, a member carried by said armature engaging a slot in said arm for holding said arm in its lower position when said armature is retracted due to no current flow, said slot being arranged to release said arm when said armature is advanced due to the passage of normal welding current, and spring means elevating said arm when so released.

6. A welding electrode holder comprising a housing constituting a support and handle, an arm extending axially beyond said housing and pivoted thereto, an electrode clamp carried at the free end of said arm, electromagnetic means connected to be actuated in response to variations in welding current and having an armature movable axially in accordance with variations in welding current, a member carried by said armature engaging a slot in said arm for holding said arm in its lower position when said armature is retracted due to no current flow, said slot being arranged to release said arm when said armature is advanced due to the passage of normal welding current, spring means elevating said arm when so released, said armature having frequency response characteristics suited to cause vibration thereof at the frequency of globule formation during welding, and an audible signalling device comprising a sound emitting diaphragm positioned to be actuated by said armature when retracted to a position corresponding to a reduced welding current and to be vibrated thereby for producing an audible signal.

7. A welding electrode holder comprising a housing constituting a support and handle, an arm extending axially beyond said housing and pivoted thereto, an electrode clamp carried at the free end of said arm, electromagnetic means connected to be actuated in response to variations in welding current and having an armature movable axially in accordance with variations in welding current, a member carried by said armature engaging a slot in said arm for holding said arm in its lower position when said armature is retracted due to no current flow, said slot being arranged to release said arm when said armature is advanced due to the passage of normal welding current, spring means elevating said arm when so released, said armature having frequency response characteristics suited to cause vibration thereof at the frequency of globule formation during welding, an audible signalling device comprising a sound emitting diaphragm, means preventing transmission of vibrations from said armature to said diaphragm when said armature is in an advanced position corresponding to normal welding current flow, and means connecting said armature to transmit vibrations to said diaphragm when in a position corresponding to reduced current flow.

8. A welding electrode holder comprising a housing constituting a support and handle, an arm extending axially beyond said housing and pivoted thereto, an electrode clamp carried at the free end of said arm, electromagnetic means connected to be actuated in response to variations in welding current and having an armature movable axially in accordance with variations in welding current, a member carried by said armature engaging a slot in said arm for holding said arm in its lower position when said armature is retracted due to no current flow, said slot being arranged to release said arm when said armature is advanced due to the passage of normal welding current, spring means elevating said arm when so released, said armature having frequency response characteristics and being arranged for transverse vibration about said member as an axis at a frequency corresponding to that of globule formation during welding, and an audible signaling device comprising means actuated by transverse vibration of said armature when in a position corresponding to reduced welding current to emit an audible signal.

9. A welding electrode holder comprising a housing constituting a support and handle, an arm extending beyond said housing for carrying a welding electrode, a signalling means, means within said housing comprising an electromagnetic coil connected in series with the welding current, means operated in response to the welding current in said coil for striking a welding arc, and means responsive to variations in the welding current in said coil for actuating the signalling means.

ACHILLES C. GOUGH.